United States Patent [19]

McGahee

[11] 3,828,734
[45] Aug. 13, 1974

[54] ANIMAL COLLAR OR HARNESS AND LEASH WITH QUICK CONNECTOR

[75] Inventor: Welbourne D. McGahee, Melbourne, Fla.

[73] Assignee: Loop A Liner, Inc., Melbourne, Fla.

[22] Filed: Jan. 2, 1974

[21] Appl. No.: 430,323

[52] U.S. Cl................................ 119/109, 119/110
[51] Int. Cl............................................ A01k 27/00
[58] Field of Search.................... 119/106, 109–111

[56] References Cited
UNITED STATES PATENTS
2,743,702   5/1956   Sullivan .............................. 119/106
3,011,478   12/1961   Kirby .................................. 119/106

Primary Examiner—Louis G. Mancene
Assistant Examiner—J. N. Eskovitz
Attorney, Agent, or Firm—Warren E. Ray

[57] ABSTRACT

Animal collar or harness and leash having a quick connector therebetween including a stud on the collar for receiving an elongated eye member with retaining ring of sufficient length to mate with a bend between a central shaft extending centrally through an oval horizontal eye member having a pair of upstanding members connected to the short sides of the oval horizontal eye member. The pair of upstanding members is provided with a lower bend that connects to a swivel element with an eye that receives an animal leash. In a modification the order of the connector elements are reversed.

10 Claims, 3 Drawing Figures

PATENTED AUG 13 1974 3,828,734
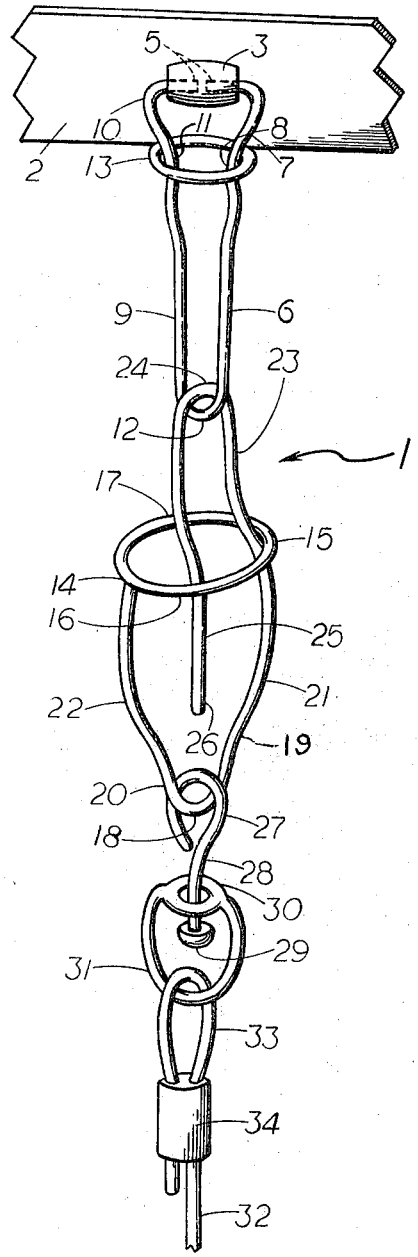
FIG. 1
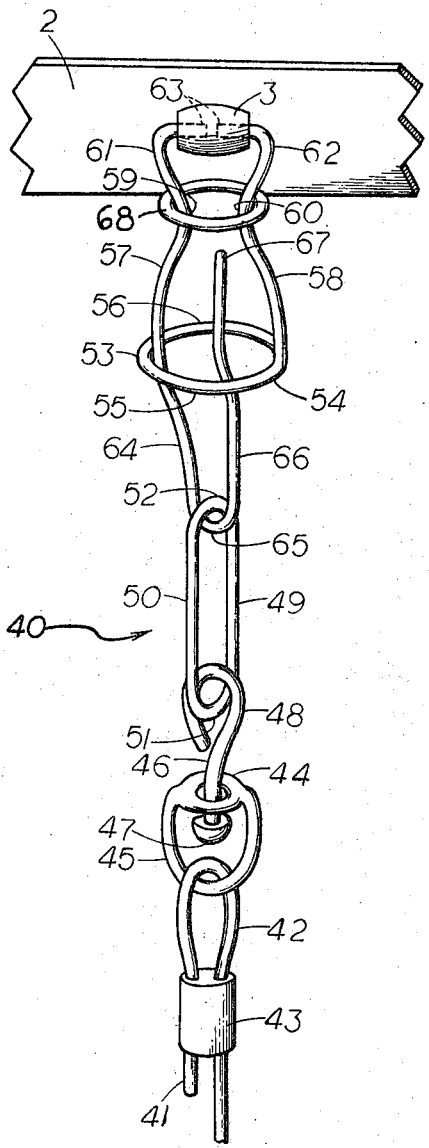
FIG. 2
FIG. 3

3,828,734

ANIMAL COLLAR OR HARNESS AND LEASH WITH QUICK CONNECTOR

BACKGROUND OF THE INVENTION

This invention relates to animal leashes, and more particularly to quick connect-disconnect elements utilized between the collar or harness and leash not requiring the tieing or untieing of knots. The connector is readily attachable and detachable, but will not separate inadvertently.

The collar or harness and the leash are conventional as commercially available for various animals, usually dogs but not limited to such use, the novelty being in the connector elements for which no prior art is known to applicant.

BRIEF SUMMARY OF THE INVENTION

Taken in conjunction with the ABSTRACT a quick connect-disconnect connector apparatus is provided wherein a stud on a collar or harness receives the ends of an elongated eye member and retained in said stud by a retaining ring. The special connector per se includes an oval horizontal eye provided with a pair of upstanding members having a lower bend therebetween and connected to the short sides of the oval horizontal eye member a predetermined distance to a bend and turns downward as a central shaft through the oval horizontal eye member to an end located between the pair of upstanding members. The elongated eye is of such length as to cooperate with the connector central shaft. The oval horizontal eye member is further connected through a swivel eye member and another eye member to a conventional leash line. In a modification the elements are reversed.

The invention in the foregoing aspects and in other subsidiary or related aspects will be fully apprehended from the following detailed description of preferred embodiments taken in conjunction with the appended drawings, in which:

BRIEF DESCRIPTION OF THE SEVERAL VIEWS OF THE DRAWING

FIG. 1 is a somewhat pictorial view of the collar-connector-leash elements;

FIG. 2 is a partial side view showing the collar stud with a hole; and

FIG. 3 illustrates the special connector and elongated eye member in a reversed arrangement from that shown in FIG. 1.

DETAILED DESCRIPTION

While a portion only of a collar or harness is illustrated, such being conventional, it will be understood that either a collar or a harness is disclosed and intended to include all such conventional apparatus combined with the special connector described hereinafter.

Turning now to the drawing FIGS. 1 and 2 illustrate the special connector between an animal collar and a leash. The numeral 1 generally indicates the collar, leash, and quick connector. A portion 2 of an animal collar or harness is provided with a stud or knob 3 attached to the collar in any known manner having a hole 4 therethrough (see FIG. 2). While the manner in which stud 3 is connected to the collar 2 is not shown in FIG. 2 it will be understood that the interconnection is conventional (typically horizontal fingers are separated from the animal with another layer of collar material). An elongated eye member having a right side 6, a left side 9, and a lower bend 12 is provided with ends 5 retained in the hole 4 in knob 3 by a ring 13. The side members are flared at 7, 10 adjacent the ends 5 provided with inner bends or indentations at 8, 11 to hold the retaining ring 13 in place unless intentional force is used to slide the ring 13 downward in attaching or removing the elongated eye from the stud or knob 3.

The special connector in FIG. 1 includes a right upstanding member 19, a left upstanding member 20, a lower bend 18 therebetween, the left upstanding member 20 continuing upward through a flared portion 22 to a junction with the left short side 14 of the oval horizontal eye, the right upstanding member 19 continuing upward through a flared portion 21 to a connection with the right short side 15 of the oval horizontal eye member with an extension 23 above the oval horizontal eye having an upper bend 24 connected to a central shaft 25 with end 26 passing centrally back down through the oval horizontal eye a substantial distance. The front long side 16 and the back long side 17 connected to the left and right short sides 14, 15 of the oval horizontal eye member are proportioned so that to effect a connection with the elongated eye the latter must be passed with flat side along an oval horizontal eye long side alongside the central shaft 25 so that bend 12 passes over the end 26 of the central shaft after which a pull will place the elements in the position shown in FIG. 1. It should be noted that the elongated eye with lower bend 12 cannot be inserted or removed with the flat side along a short side of the oval horizontal eye thereby insuring that inadvertent disconnection is virtually impossible.

The bend 18 is mated with an eye member 27 having a shank 28 retained in eye 30 of a further connector or eye member 31 by head 29 on shank 28 here shown as semi-spherical but which could be any known geometrical shape. An animal leash 32 is provided with a loop 33 passing through eye member 31 with the loop 33 being retained by any known means such as crimping device 34.

The above described arrangement provides a quick connect-disconnect apparatus providing unlimited swivel action between an animal leash and collar or harness with little liklihood of inadvertent disconnection.

In FIG. 3 the order of some of the parts, generally indicated by the numeral 40, are reversed yet providing the same advantages of the apparatus hereinbefore described. The portion 2 of an animal collar or harness is provided with the knob or stud 3 with hole 4 as previously described. A leash 41 with loop 42 held with a crimping device 43 interconnects with eye member 45 as in FIG. 1. The eye member 45 is provided with an eye 44 that receives the shank 46 of another eye member 48 having a head 47 as disclosed in FIG. 1. Mating the eye member 48 is an elongated eye member having a right side 49, a left side 50, and connected by a lower bend 51 and upper bend 52. The oval horizontal eye includes a left short side 53, a right short side 54, a front long side 55, and a back long side 56. A right upstanding member 58 is joined to the oval horizontal eye at short side 54, and a left upstanding side 57 is connected to the left short side 53 of the oval horizontal eye, these side members continuing upward to inner bends or indentations 59, 60 to receive the retaining ring 68 and to flared portions 61, 62 culminating in ends 63 in the hole 4 in stud 3. The left upstanding member 57 continues downward with an extension 64 having a lower bend 65 whereby a central shaft 66 with end 67 passes back upwards centrally through the oval horizontal eye member a substantial distance. The elongated eye member is inserted and removed from the special connector having central shaft 66 as described with respect to FIG. 1. While the oval horizontal eye member has been illustrated and described as oval with long sides and short sides it will be understood that this member might well be rectangular with the same results.

There has been disclosed and described the combination between an animal collar or harness and a leash a novel connector that permits a quick connection or disconnection without the tieing or untieing of knots and with little likelihood of inadvertent release.

It will be apparent that the embodiments shown are only exemplary and that various modifications can be made in construction and arrangement within the scope of my invention as defined in the appended claims.

I claim:

1. An animal leash arrangement including a leash and a collar, in combination comprising a special connector including an oval horizontal eye member, said oval horizontal eye member having a pair of short sides and a pair of long sides, a pair of upstanding sides connected to the said short sides of said oval horizontal eye member, one of said upstanding sides continuing on the other side of said oval horizontal eye member to a bend and thence back centrally through the said oval horizontal eye member a substantial distance defining a central shaft, a stud on said collar, a first means joining said special connector to said stud, and a second means joining said special connector to said leash.

2. An animal leash arrangement according to claim 1 wherein said first means comprises an elongated eye member engageable with said central shaft only by passing a flat side along a long side and through said oval horizontal eye member, and wherein the distal end of said elongated eye member is connected to said collar stud.

3. An animal leash arrangement according to claim 2 wherein said elongated eye member is provided with indentations adjacent the said distal end thereof, and a retaining ring cooperating with said indentations to retain the connection of said elongated eye member with said collar stud.

4. An animal leash arrangement according to claim 1 wherein said pair of upstanding sides includes a lower bend therebetween, and wherein said second means comprises a first eye member cooperating with said lower bend, a swivel member receiving said leash, said swivel member having eye, said first eye member having a shank passing through said swivel member eye, said first eye member shank having a head for retaining said first eye member and said swivel member together.

5. An animal leash arrangement according to claim 1 wherein said first means comprises an elongated eye member engageable with said central shaft only by passing a flat side along a long side and through said oval horizontal eye member, the distal end of said elongated eye member being connected to said collar stud, and wherein said pair of upstanding sides includes a lower bend therebetween, said second means comprising a first eye member cooperating with said lower bend, a swivel member receiving said leash, said swivel member having an eye, said first eye member having a shank passing through said swivel member eye, said first eye member shank having a head for retaining said first eye member and said swivel member together.

6. An animal leash arrangement according to claim 1 wherein said first means comprises flared portions on said pair of upstanding sides, said flared portions culminating in ends connected to said collar stud.

7. An animal leash arrangement according to claim 6 wherein said pair of upstanding sides are provided with a pair of indentations adjacent said flared portions, and a retaining ring cooperating with said indentations to retain the connection of said upstanding sides with said collar stud.

8. An animal leash arrangement according to claim 1 wherein said second means comprises an elongated eye member having an upper and a lower bend, said elongated eye member engageable with said central shaft only by passing a flat side along a long side and through said oval horizontal eye member whereby said upper bend and central shaft bend are engaged, and swivel and eye members cooperating with said elongated eye member lower bend and said leash.

9. An animal leash arrangement according to claim 1 wherein said first means comprises flared portions on said pair of upstanding sides, said flared portions culminating in ends connected to said collar stud, and wherein said second means comprises an elongated eye member having an upper and a lower bend, said elongated eye member engageable with said central shaft only by passing a flat side along a long side and through said oval horizontal eye member whereby said upper bend and central shaft bend are engaged, and swivel and eye members cooperating with said elongated eye member lower bend and said leash.

10. An animal leash arrangement according to claim 9 wherein said swivel and eye members comprise a shank on said eye member passing through an eye on said swivel member, said shank having a head for retaining the swivel and eye members together.

* * * * *